United States Patent [19]

Parker et al.

[11] Patent Number: 5,174,193
[45] Date of Patent: Dec. 29, 1992

[54] PISTONS FOR ENGINES OR MOTORS

[75] Inventors: David A. Parker; Michael L. P. Rhodes, both of Rugby, United Kingdom

[73] Assignee: T&N Technology Limited, Warwickshire, United Kingdom

[21] Appl. No.: 884,235

[22] Filed: May 11, 1992

Related U.S. Application Data

[63] Continuation of Ser. No. 713,062, Jun. 11, 1991, abandoned.

[30] Foreign Application Priority Data

Jun. 23, 1990 [GB] United Kingdom ................ 9014048
Jun. 23. 1990 [GB] United Kingdom ................ 9014049

[51] Int. Cl.$^5$ .................................... F16J 1/04
[52] U.S. Cl. .............................. 92/212; 92/222; 92/238; 92/126; 123/193.6
[58] Field of Search ............... 92/126, 212, 213, 222, 92/223, 238, 224, 225, 231, 232; 123/193.6

[56] References Cited

U.S. PATENT DOCUMENTS

| 3,152,523 | 10/1964 | Whitfield et al. | |
|---|---|---|---|
| 3,505,934 | 4/1970 | De Biasse | 92/212 |
| 3,906,923 | 9/1975 | Harker | 92/212 |
| 3,983,793 | 10/1976 | Beardmore | 92/126 |
| 4,158,328 | 6/1979 | Beardmore | 92/212 |
| 4,306,489 | 12/1981 | Driver et al. | 92/224 |
| 4,440,069 | 4/1984 | Holtzberg et al. | 123/193 P |
| 4,450,610 | 5/1984 | Schaper | 92/224 |

FOREIGN PATENT DOCUMENTS

| 0049006 | 4/1982 | European Pat. Off. | 92/212 |
|---|---|---|---|
| 651046 | 2/1929 | France . | |
| 651929 | 3/1929 | France . | |
| 974270 | 11/1964 | United Kingdom . | |
| 1422776 | 1/1976 | United Kingdom . | |
| 1529088 | 10/1978 | United Kingdom . | |
| 2104188 | 3/1983 | United Kingdom | 123/193 P |
| 2129523 | 5/1984 | United Kingdom . | |
| 2162614 | 2/1986 | United Kingdom . | |
| 2188122 | 3/1987 | United Kingdom . | |
| 2198210 | 11/1987 | United Kingdom . | |

Primary Examiner—Thomas E. Denion
Attorney, Agent, or Firm—Nixon & Vanderhye

[57] ABSTRACT

The piston comprises a crown (12), and a skirt 30 made of plastics material secured to the crown. The crown (12) is formed integrally with a depending boss (16) arranged to receive a gudgeon pin (18) by which the piston is connected to a connecting rod (24). The skirt (30) encircles the boss (16) and is spaced therefrom.

6 Claims, 2 Drawing Sheets

PISTONS FOR ENGINES OR MOTORS

This is a continuation of application Ser. No. 07/713,062, filed Jun. 11, 1991, now abandoned.

BACKGROUND TO THE INVENTION

The present invention is concerned with a piston for an engine or motor, e.g. for an internal combustion engine.

A piston for an internal combustion engine normally comprises a crown and a skirt. The crown may be made of metal, such as aluminium, an alloy of aluminium, or a ferrous material, or may be made of a ceramic material. The crown provides a surface against which the force of the combustion gases acts and provides grooves in which rings are mounted to seal the piston against the surface of a bore in which the piston reciprocates. The skirt of such a piston serves to guide the piston in said bore.

In many cases, the crown and skirt of a piston are of integral construction of the same material. Normally, the skirt provides two spaced bores which receive a gudgeon pin by which the piston is connected to a connecting rod. It is, however, known (see GB Patent Specification No. 1,422,776) to provide a gudgeon pin boss which depends from the crown and provides the bore for receiving the gudgeon pin, the metal piston skirt encircling the boss. This arrangement allows a shorter and, therefore, lighter gudgeon pin to be used. Such a boss may be in two portions to support opposite ends of the gudgeon pin.

It is known for the skirt to be made as a different piece from the crown and to be secured thereto, this being done in the interests of ease of manufacture. The different piece may also be of a different material from the crown or to be coated with a different material. Where the skirt is a different piece, it may be joined to the crown through the gudgeon pin (see GB 2188122A) or may be supported partially by the crown and partially by the gudgeon pin boss (see GB 2129523A) so that a rigid skirt is formed. The skirt may be of plastics material or may be coated with plastics material.

As such pistons reciprocate in the operation of an engine or motor, they are subject to lateral forces tending to press them against the wall of the bore in which they reciprocate. This creates noise, known as "slap noise", which becomes more significant with modern quieter engines. The use of a rigid plastics or plastics coated skirt reduces slap noise because of the inherent sound-damping characteristics of plastics materials, but the slap noise is still significant.

It is an object of the present invention to provide a piston in which slap noise is reduced.

BRIEF SUMMARY OF THE INVENTION

The invention provides a piston for an engine or motor comprising a first portion made from a material selected from the group comprising metal and ceramic, and a second portion made from plastics material, the first portion comprising a crown of the piston and a depending central boss integral with the crown and arranged to receive a gudgeon pin by which the piston is connected to a connecting rod, the boss providing the sole connection between the piston and the gudgeon pin, wherein the second portion is secured to portions of the crown away from the boss, and wherein the second portion comprises a depending flexible skirt which encircles the boss and is spaced therefrom the skirt being free to flex in directions towards or away from the boss.

A piston in accordance with the invention has a skirt which can give when impacted with the side wall of the bore in which it reciprocates so that slap noise is reduced. This reduction is in addition to the slap noise reduction given by the use of plastics material. Furthermore, the use of such a skirt because of its conformability can allow smaller operating clearances in the bore which also reduces slap noise, and enhances the sealing capabilities of the ring pack of the piston. The small gudgeon pin and reduced weight skirt also provides a significant weight reduction which, by reducing the reciprocating mass, improves fuel consumption, and the possible speed of operation. Furthermore, lighter connecting rods and smaller bearings may be possible.

Preferably, the skirt of the piston is injection moulded directly on to the crown, i.e. the crown is placed in the mould of an injection moulding machine and the skirt is moulded on to it. The crown is formed with a protrusion in the form of a bulbous rib which is embedded in the skirt by the injection molding process to secure the skirt to the crown so that the skirt can be firmly attached whether or not it is directly moulded on to the crown.

In order to reduce the friction between the piston and its associated cylinder, the skirt may be formed with integral pads on two thrust surfaces thereof to transmit lateral thrusts of the piston against the wall of the associated cylinder. Alternatively, the skirt may be formed with apertures in two thrust faces thereof and inserts in these apertures may form pads to transmit lateral thrusts of the piston against the wall of an associated cylinder, the inserts being of a different material to the skirt. Different inserts in the same skirt may be of different materials. The inserts may be injection moulded into the apertures, preferably from the inwardly-directed face of skirt. Each pad may be bevelled to cause lubricant to be forced over the pad by hydrodynamic action during reciprocation of the piston, so that wear is reduced. A metal skirt of similar construction is described in GB 2104188A.

The skirt and separate inserts may be made from a plastics material selected from polyetheretherketone, polyetherketone, a polyparaydroxy benzoic acid, polyethyleneterephthalate, a silicon modified polyester, polyetherimide, a polyarimid, a polyimide, a polyamideimide, polyphenylene sulphide, a plastics alloy of polyetherketone and a polyarylene sulphide, and Nylon 6 modified with terephthalic acid. The plastics material may be reinforced with fillers or fibres, e.g. of glass or carbon, and may be post cured. Separate inserts may also be made of ceramics material.

BRIEF DESCRIPTION OF THE DRAWINGS

There now follows a detailed description, to be read with reference to the accompanying drawings, of three illustrative embodiments of the invention.

In the drawings.

DETAILED DESCRIPTION OF PREFERRED EMBODIMENTS OF THE INVENTION

Figure 1:
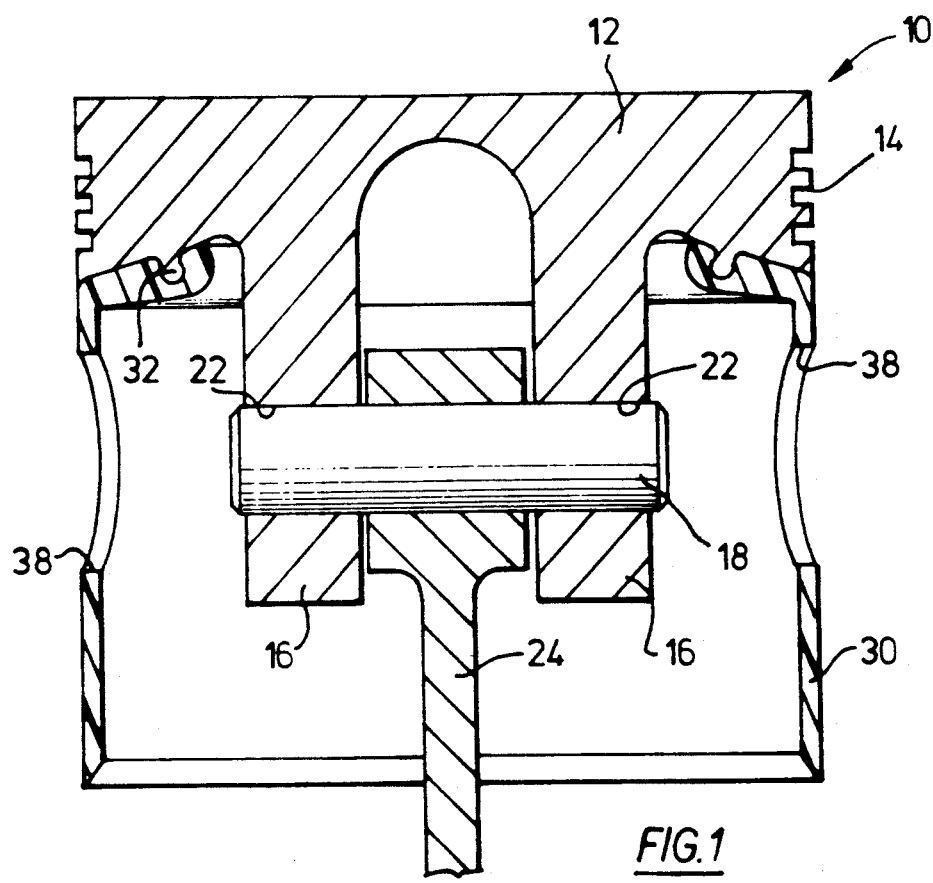
FIG. 1 is a vertical cross-section taken through a first illustrative piston.

The first illustrative piston 10 is for an internal combustion engine and comprises first portion made from aluminium alloy and a second portion made from polyetheretherketone. The first portion comprises a crown 12 and a depending central boss 16. The second portion is secured to portions of the crown 12 away from the boss 16 by injection molding the second portion on to the crown 12 so that a protrusion 32 of the crown is embedded therein. The protrusion 32 is in the form of an annular rib extending from the lower side of the crown 12 and has a bulbous shape so that it keys into the plastics material of the skirt 30. In an alternative construction, the protrusion 32 could be replaced by an undercut groove.

The crown 12 has a ring belt 14 for the usual piston rings and is formed integrally with a depending boss 16 arranged to receive a gudgeon pin 18 by which the piston 10 is connected to a connecting rod 24. The boss 16 has two spaced portions each having a bore 22 therein to receive the gudgeon pin 18 and between which the small end of the connecting rod 24 is positioned. The boss 16 provides the sole connection between the piston 10 and the gudgeon pin 18.

The boss 16 projects downwardly centrally of the crown 12 and a depending skirt 30 of the second portion encircles the boss 16 and is spaced therefrom. The skirt 30 is, therefore, supported solely by portions of the crown 12 away from the boss 16. The skirt 30 is flexible and is free to flex in directions towards and away from the boss 16.

The skirt 30 is provided with two circular apertures 38 to enable assembly of the gudgeon pin 18 in the bores 22.

Figure 3:
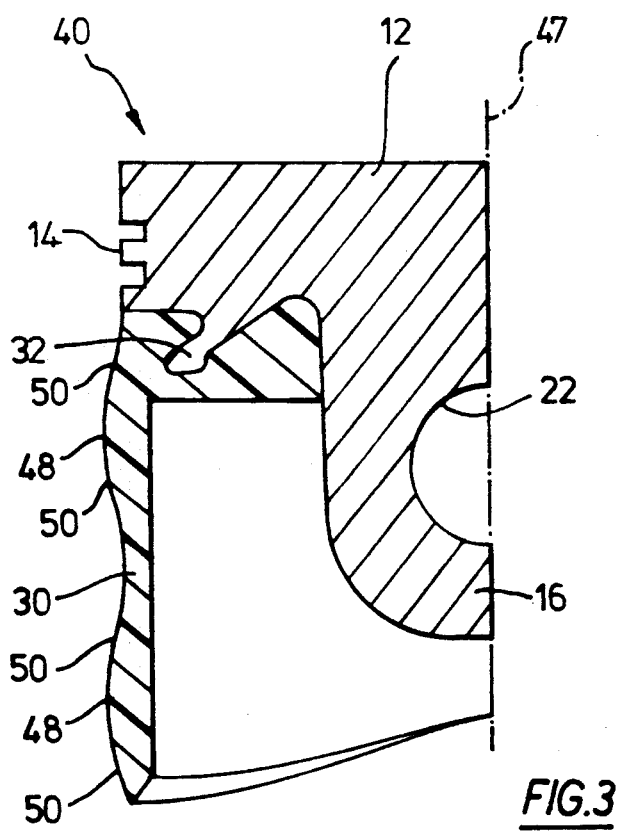
FIG. 3 is a half section taken on the line III—III in FIG. 2.
Figure 2:
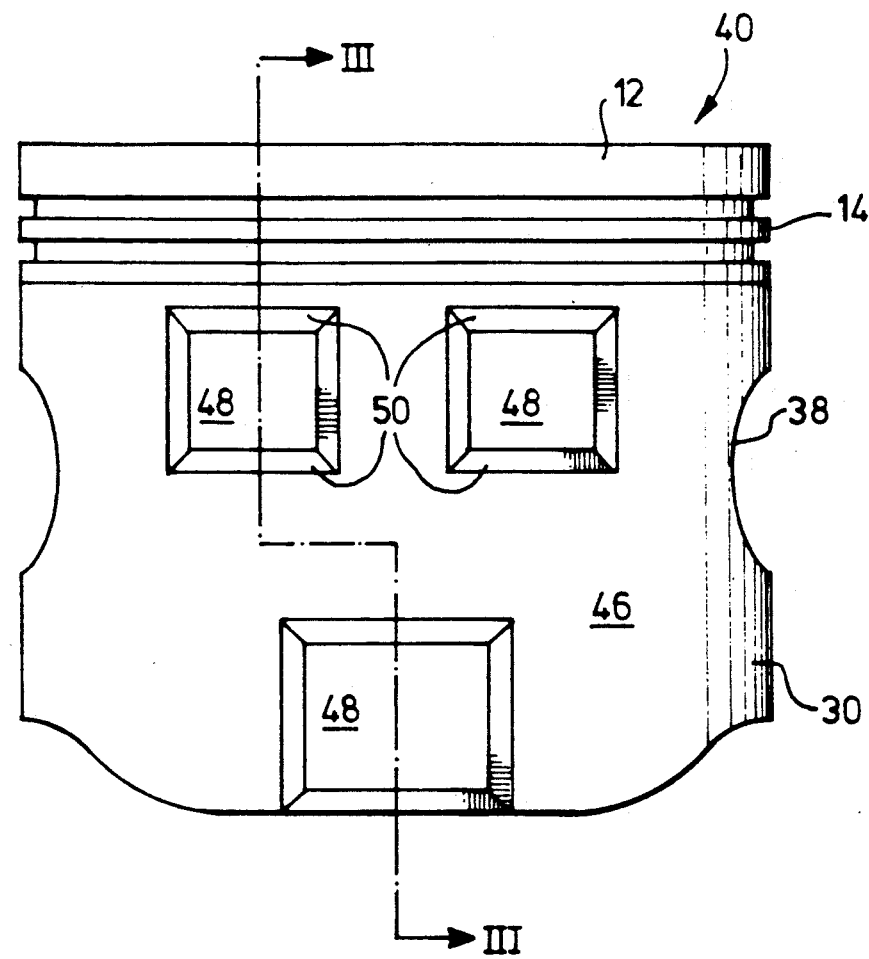
FIG. 2 is a side elevational view of a second illustrative piston.

The second illustrative piston 40 shown in FIGS. 2 and 3 is similar in many respects to the first illustrative piston 10 and like parts are given the same reference numerals.

The piston 40 has a crown 12 with a ring band 14 and a protrusion 32 which has the same purpose as the protrusion of the piston 10 but is angled outwardly. The crown 12 also has a boss 16 equipped with bores 22 to receive a gudgeon pin.

The piston 40 also has a skirt 30 of a plastics portion thereof which is injection moulded on to the crown 12. The skirt 30 is similar to the skirt 30 of the piston 10, having apertures 38, but has a sinusoidal lower edge so that two thrust faces 46 thereof extend further from the crown 12 than the remainder of the skirt 30.

The thrust faces 46 are diametrically-opposed with respect to a central axis 47 of the piston 40. Each thrust face 46 is formed with three integral pads 48 which project further from the axis 47 than the remainder of the skirt 30. These pads 48 are to transmit lateral thrusts of the piston 40 against the wall of an associated cylinder (not shown). Each pad 48 has bevelled edges 50. The upper and lower bevelled edges 50 cause lubricant to be forced over the pad 48 by hydrodynamic action during reciprocation of the piston 40 in similar manner to that described in GB 2104188A. The pads 50 are dome-shaped as shown in FIG. 3 and may be machined after injection moulding of the skirt 30 to remove flash or improve their shape.

Figure 4:
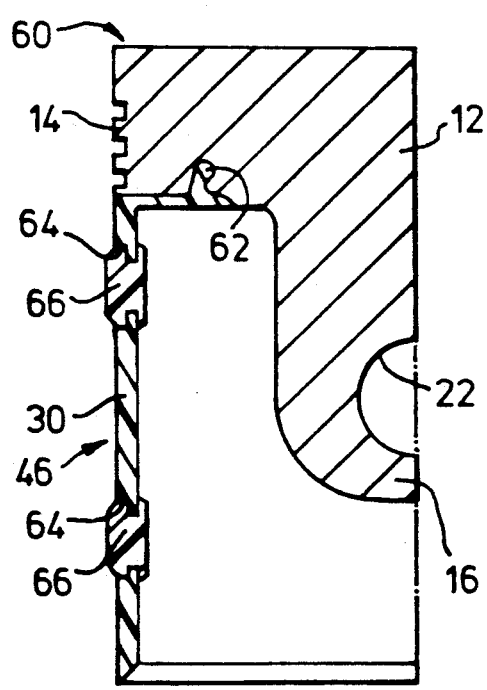
FIG. 4 is a view similar to FIG. 3 but of a third illustrative piston.

FIG. 4 shows the third illustrative piston 60 which has a crown 12 and a skirt 30. The crown 12 has a boss 16 equipped with bores 22 to receive a gudgeon pin. The plastics portion of the piston 60 differs from those of the pistons 10 and 40 in that it extends into a groove 62 in the underside of the crown 12, the plastics portion being injection moulded on to the crown 12 so that plastics material of the skirt 30 enters the groove 62 which is undercut so that the plastics portions is secured to the crown 12.

The skirt 30 of the piston 60 is formed with three apertures 64 in each of its two thrust faces 46 and inserts 66 in these apertures 64 form pads to transmit lateral thrusts of the piston 60 in the same manner as the pads 48 of the piston 40. These inserts 66 have the same shape as the pads 48 on the outwardly-facing surface of the skirt 30. The inserts 66 are injection moulded into the apertures 64 from the inwardly-facing side of the skirt 30.

We claim:

1. A piston for an engine or motor comprising a first portion made form a material selected from the group comprising metal and ceramic, and a second portion made form plastics material, the first portion comprising a crown of the piston and a depending central boss integral with the crown and arranged to receive a gudgeon pin by which the piston is connected to a connecting rod, the boss providing the sole connection between the piston and the gudgeon pin, wherein the second portion is secured to portions of the crown away from the boss, and wherein the second portion comprises a depending flexible skirt which encircles the boss and is spaced therefrom, the skirt being free to flex in directions towards or away from the boss.

2. A piston according to claim 1, wherein the skirt is injection molded directly on to the crown so that a protrusion in the form of an annular bulbous rib is embedded in the skirt to secure the skirt to the crown.

3. A piston according to claim 1, wherein the skirt is formed with integral pads on two thrust faces thereof to transmit lateral thrusts of the piston against a wall of an associated cylinder.

4. A piston according to claim 1, wherein the skirt is formed with apertures in two thrust faces thereof and inserts in these apertures form pads to transmit lateral thrusts of the piston against the wall of an associated cylinder.

5. A piston according to claim 4, wherein the inserts are injection molded into the apertures.

6. A piston according to claim 3, wherein each pad is bevelled to cause lubricant to be forced over the pad by hydrodynamic action during reciprocation of the piston.

* * * * *